US011838401B2

(12) United States Patent
Walters et al.

(10) Patent No.: US 11,838,401 B2
(45) Date of Patent: *Dec. 5, 2023

(54) TRANSMITTING ENCODED DATA ALONG TRANSMISSION MEDIUMS BASED ON COLORSPACE SCHEMES

(71) Applicant: Capital One Services, LLC, McLean, VA (US)

(72) Inventors: Austin Grant Walters, Savoy, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/506,114

(22) Filed: Oct. 20, 2021

(65) Prior Publication Data
US 2022/0038255 A1  Feb. 3, 2022

Related U.S. Application Data

(63) Continuation of application No. 16/689,013, filed on Nov. 19, 2019, now Pat. No. 11,184,150, which is a
(Continued)

(51) Int. Cl.
*H04L 9/06* (2006.01)
*H04B 10/85* (2013.01)
*H04L 9/08* (2006.01)

(52) U.S. Cl.
CPC ........... *H04L 9/0618* (2013.01); *H04B 10/85* (2013.01); *H04L 9/0822* (2013.01)

(58) Field of Classification Search
CPC ....... H04L 9/0618; H04L 9/0822; H04L 9/16; H04B 10/85; H04B 10/516; G09G 2340/06
See application file for complete search history.

(56) References Cited

U.S. PATENT DOCUMENTS 5,394,410 A * 2/1995 Chen .................. H04L 1/08
714/823
5,678,033 A * 10/1997 Moledina ............. H04N 1/6019
358/525
(Continued)

FOREIGN PATENT DOCUMENTS

CN  206097730 U  4/2017
EP   3192022 A1  7/2017
(Continued)

*Primary Examiner* — Meng Li
(74) *Attorney, Agent, or Firm* — KDW Firm PLLC

(57) ABSTRACT

Techniques to transmit encoded data along a transmission medium and decode the transmitted data along the transmission medium are provided. Some techniques include logic to encode data transmitted along a transmission medium, such as a fiberoptic line or cable, where the encoding is pursuant to a conversion between a first and second colorspace. The logic may further be configured to decode the data once it is received at a node along the fiberoptic line, where the colorspace conversion provides the basis, key, or cipher for preforming the decoding operation. The logic may be further configured to alter the encryption and decryption basis, key, or cypher by altering the colorspace scheme defining the encoding (and by extension the decoding) during transmission, including a transmission that takes place after a previous transmission governed by the previously defined (and subsequently altered) colorspace conversion scheme. Other embodiments are described and claimed.

20 Claims, 10 Drawing Sheets

Related U.S. Application Data continuation of application No. 16/388,398, filed on Apr. 18, 2019, now Pat. No. 10,523,420.

(56) References Cited

U.S. PATENT DOCUMENTS

| | | | |
|---|---|---|---|
| 5,956,431 A * | 9/1999 | Iourcha | G06T 9/005 |
| | | | 382/253 |
| 6,075,330 A * | 6/2000 | Terk | H01Q 3/005 |
| | | | 455/3.03 |
| 6,805,419 B1 * | 10/2004 | Walmsley | G06K 15/102 |
| | | | 347/5 |
| 6,956,967 B2 | 10/2005 | Gindele et al. | |
| 7,170,645 B2 | 1/2007 | Kim et al. | |
| 7,314,283 B2 | 1/2008 | Tsukada | |
| 7,327,875 B2 * | 2/2008 | Sawada | H04N 1/6019 |
| | | | 382/162 |
| 7,755,671 B2 | 7/2010 | Wang et al. | |
| 8,483,479 B2 | 7/2013 | Kunkel et al. | |
| 8,533,166 B1 * | 9/2013 | Sulieman | H04L 67/06 |
| | | | 375/240 |
| 8,665,347 B2 | 3/2014 | Miyawaki et al. | |
| 8,847,972 B2 | 9/2014 | Kane et al. | |
| 8,941,755 B2 | 1/2015 | Nikkanen | |
| 10,360,651 B1 | 7/2019 | Hoarty | |
| 10,977,462 B2 | 4/2021 | Walters et al. | |
| 10,977,535 B2 | 4/2021 | Walters et al. | |
| 2003/0053706 A1 * | 3/2003 | Hong | H04N 19/186 |
| | | | 382/253 |
| 2003/0176785 A1 | 9/2003 | Buckman et al. | |
| 2003/0228031 A1 * | 12/2003 | Rhoads | G06Q 20/40145 |
| | | | 707/E17.112 |
| 2004/0096058 A1 * | 5/2004 | Cho | G09C 5/00 |
| | | | 380/28 |
| 2005/0069168 A1 | 3/2005 | Zarrabizadeh | |
| 2006/0126962 A1 * | 6/2006 | Sun | H04N 19/895 |
| | | | 382/268 |
| 2007/0046956 A1 * | 3/2007 | Burlingame | G06K 15/1848 |
| | | | 358/1.2 |
| 2008/0252066 A1 | 10/2008 | Rapoport et al. | |
| 2010/0034380 A1 * | 2/2010 | Lee | H04N 1/4486 |
| | | | 380/243 |
| 2011/0101088 A1 | 5/2011 | Marguerettaz | |
| 2011/0293179 A1 * | 12/2011 | Dikmen | G06T 5/008 |
| | | | 382/167 |
| 2012/0189199 A1 * | 7/2012 | Berent | H04N 1/644 |
| | | | 382/166 |
| 2014/0259061 A1 * | 9/2014 | Delpuch | H04W 88/16 |
| | | | 725/37 |
| 2015/0104184 A1 * | 4/2015 | Jeffrey | H04L 9/3271 |
| | | | 398/130 |
| 2016/0012611 A1 | 1/2016 | Wexler et al. | |
| 2017/0061582 A1 * | 3/2017 | Lim | G06T 5/002 |
| 2017/0061584 A1 * | 3/2017 | Lim | G06T 5/002 |
| 2017/0076127 A1 * | 3/2017 | Arce | G06K 19/06056 |
| 2017/0220916 A1 * | 8/2017 | Zhao | G06K 19/06028 |
| 2019/0130213 A1 * | 5/2019 | Shazeer | G06V 10/56 |
| 2020/0320360 A1 * | 10/2020 | Walters | G06K 7/12 |
| 2021/0200969 A1 | 7/2021 | Walters et al. | |
| 2021/0201098 A1 | 7/2021 | Walters et al. | |
| 2021/0201099 A1 * | 7/2021 | Walters | G06V 10/507 |

FOREIGN PATENT DOCUMENTS

| | | |
|---|---|---|
| JP | 2017027583 A | 2/2017 |
| KR | 20010011701 A | 2/2001 |
| WO | 2016133911 A1 | 8/2016 |

\* cited by examiner

700

```
┌─────────────────────────────────────────────────────┐
│ RECEIVING AN ENCRYPTED SIGNAL VIA A TRANSMISSION    │
│ MEDIUM AT A RECEIVING LOCATION ASSOCIATED WITH A    │
│ TRANSMISSION MEDIUM, WHERE THE ENCRYPTED SIGNAL     │
│ CONTAINS DATA ENCRYPTED BASED ON A CONVERSION FROM A│
│     FIRST COLOR-SPACE TO A SECOND COLOR-SPACE       │
│                         710                         │
└─────────────────────────────────────────────────────┘
                           │
┌─────────────────────────────────────────────────────┐
│  DECRYPTING, BY A COMPUTER PROCESSOR, THE RECEIVED  │
│  ENCRYPTED SIGNAL, WHERE THE DECRYPTION IS BASED ON A│
│   DECRYPTION CIPHER, AND WHERE THE DECRYPTION CIPHER IS│
│         BASED ON THE SECOND COLOR-SPACE             │
│                         715                         │
└─────────────────────────────────────────────────────┘
                           │
┌─────────────────────────────────────────────────────┐
│   STORING THE DECRYPTED SIGNAL IN A NON-TRANSITORY  │
│         STORAGE COMPONENT ASSOCIATED                │
│              WITH A COMPUTER PROCESSOR              │
│                         720                         │
└─────────────────────────────────────────────────────┘
```

*FIG. 7*

TRANSMITTING ENCODED DATA ALONG TRANSMISSION MEDIUMS BASED ON COLORSPACE SCHEMES

RELATED APPLICATION

This application is a continuation of U.S. patent application Ser. No. 16/689,013, filed on Nov. 19, 2019, which is a continuation of U.S. patent application Ser. No. 16/388,398 (now U.S. Pat. No. 10,523,420), filed on Apr. 18, 2019. The contents of the aforementioned applications are incorporated herein by reference.

BACKGROUND

Transmission mediums, such as fiberoptic cables, are used to transmit data in encrypted and unencrypted form using optical signals. The amount of data transmitted along a fiber-optic or equivalent transmission medium is limited by the physical constraints of the medium and the processing power of the computing devices associated with nodes or endpoints along the line. Moreover, unencrypted data along the transmission medium poses a security vulnerability. Accordingly, methods and systems that address these concerns are desired, and is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

One aspect of the present disclosure includes an apparatus for encoding and transmitting data pursuant to one or more colorspace schemes. The apparatus includes: a memory to store instructions and processing circuitry, coupled with the memory, operable to execute the instructions, that when executed, cause the processing circuitry to: receive a first colorspace, convert the first colorspace to a second colorspace, determine a first color-channel associated with a maximum of the second colorspace and a second color-channel associated with a minimum of the second colorspace, encrypt a plurality of messages on a signal for transmission along a transmission medium, where the encryption is based on a plurality of color-channels between the first color-channel and the second color-channel, and where the second colorspace determines a key for decrypting the encrypted plurality of messages, and transmit the signal along the transmission medium.

Another aspect of the present disclosure includes a method for decoding encoded data received along a transmission medium. The method includes: receiving an encrypted signal via a transmission medium at a receiving location associated with a transmission medium, where the encrypted signal contains data encrypted based on a conversion from a first colorspace to a second colorspace, where the first colorspace is a distinct type of colorspace in relation to the second colorspace, and where the second colorspace is associated with a plurality of color-channels, decrypting, by a computer processor, the received encrypted signal, where the decryption is based on a decryption cipher, and where the decryption cipher is based on the second color-space, and storing the decrypted signal in a non-transitory storage component associated with the computer processor.

Yet another aspect of the present disclosure includes a non-transitory computer-readable storage medium storing computer-readable program code executable by a processor to: receive a plurality of data at a node of a fiberoptic transmission medium, encrypt a plurality of messages on a signal for transmission along the fiberoptic transmission medium based on a conversion between a first colorspace and a second colorspace, transmit the signal along the transmission medium, and provide a cipher for decrypting the encrypted plurality of messages at another node along the transmission medium, wherein the cipher is based on the conversion between the first colorspace and the second colorspace, and wherein the first colorspace is a different type of colorspace in relation to the second colorspace.

BRIEF DESCRIPTION OF THE DRAWINGS

FIG. 7 illustrates an embodiment of a third logic flow for the system of FIG. 1 and in accordance with at least one embodiment of the present disclosure.

DETAILED DESCRIPTION

Figure 1:
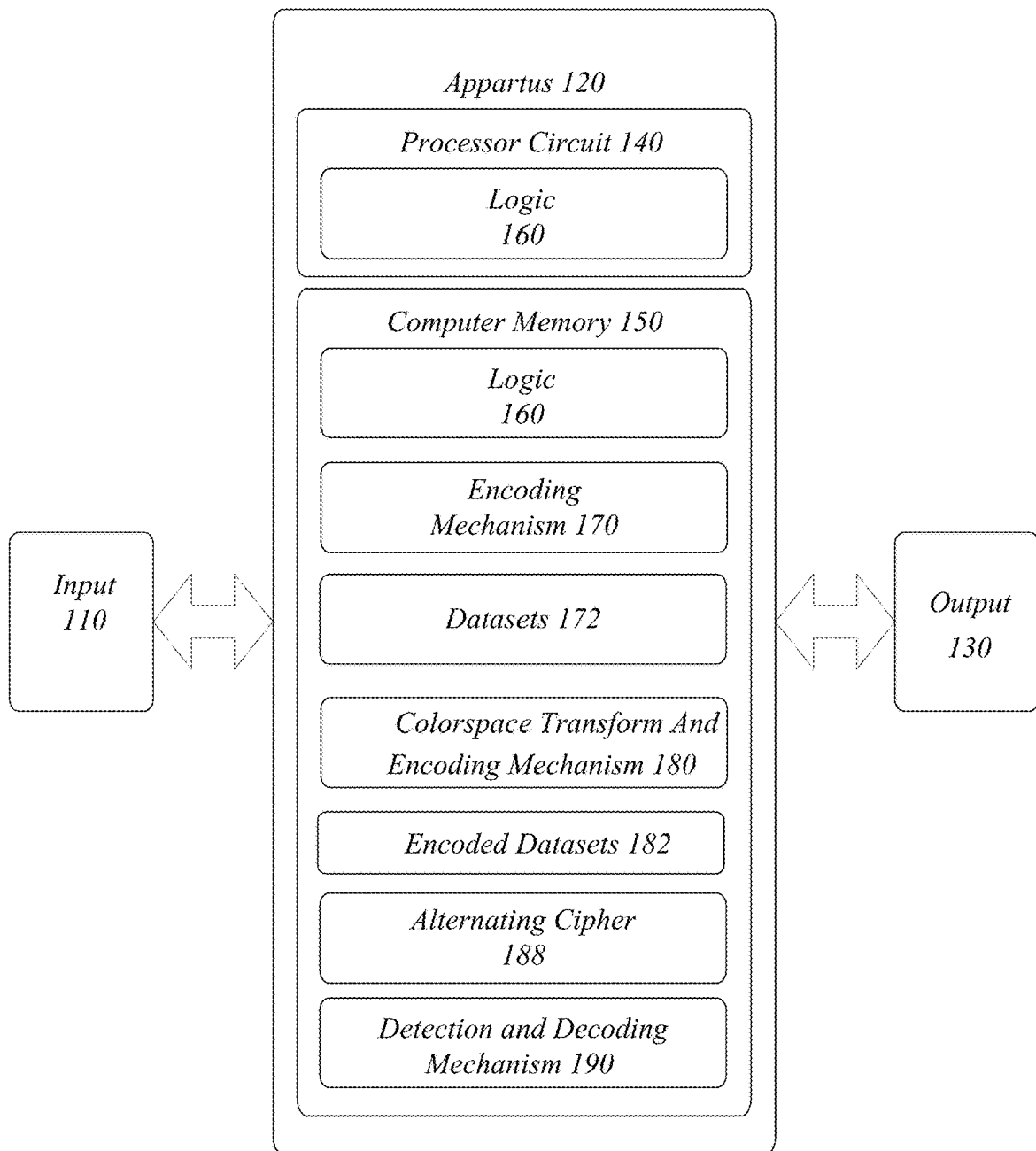
FIG. 1 illustrates an embodiment of a system to encode, transmit, and/or decode data along a transmission medium, pursuant to at least one colorspace conversion scheme, and in accordance with at least one embodiment of the present disclosure.

Various embodiments are directed to securely encoding, transmitting, and decoding data via a suitable transmission medium, such as a fiberoptic cable. Various embodiments of the present disclosure offer one or more advantages in terms of both data compression and security. In terms of compression and transmission, and pursuant to various embodiments, more data can be transmitted via the suitable transmission medium at least because one or more colorspace conversions can encode more information on one or more color-channels, e.g. a color-channel, for example, representing a color such as purple can represent two different colors (blue and red), where each represented color represents at least one bit of data. In terms of security, and pursuant to various embodiments, the data is encoded based on the one or more colorspace conversions, with the cipher being defined by the mathematical definitions, e.g. keys, governing or defining the one or more colorspace conversions. In various embodiments, the cipher is dynamic and may be changed after a successful transmission, with a device, e.g. a server or other equivalent device, updating one or more nodes (and associated processing devices connected to those nodes) of the change, which adds an additional layer of security along the transmission medium.

In various embodiments, colorspace models are configured to represent color data and encode data based on one or more color-channels, but most models differ in their representation of that color data (and by extension the color-channels that will be associated with the encoded data). For instance, the CIELAB or LAB colorspace model represents color as three values: L for the Luminance/Lightness and Alpha (A) and Beta (B) for the green-red and blue-yellow color components, respectively. The LAB colorspace model is typically used when converting from a Red-Green-Blue (RGB) colorspace model into Cyan-Magenta-Yellow-Black (CMYK).

Depending on the application, one colorspace may be preferable for transmitting and/or encoding data, and in various embodiments, converting between colorspaces can be advantageous. In various embodiments, whether information is converted to an initial colorspace (e.g. represented by colors associated with color-channels representing bits of data), or whether information is initially converted to an initial colorspace and then subsequent colorspaces, each colorspace conversion will be associated with a mathematical description of the color-channels defining that colorspace, e.g. one or more equations or values (such as a tristimulus system in RGB or XYZ), where those mathematical relationships can serve both as a means of encoding and decoding data. Accordingly, various embodiments will use one or more variations of a theme of using at least one colorspace scheme to encode, transmit, and decode data along a transmission medium, such as a fiberoptic cable. The transmitted data can be any suitable data including but not limited to financial data or information, multimedia data or information, security data or information, or any other data or information that may be suitable for transmission.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines may appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates a block diagram for a system 100. Although the system 100 shown in FIG. 1 has a limited number of elements in a certain topology, it may be appreciated that the system 100 may include more or fewer elements in alternate topologies as desired for a given implementation. The system 100 may implement some or all of the structure and/or operations for the system 100 in a single computing entity, such as entirely within a single device.

The system 100 may comprise an apparatus 120. The apparatus 120 may be generally arranged to process input 110 at one node of a transmission medium (shown in greater detail with respect to FIG. 2 and FIG. 3), such as a fiberoptic transmitter or receiver, using various components and generate (some) output 130 at another node along the transmission medium (shown in greater detail with respect to FIG. 2 and FIG. 3), such as another fiberoptic transmitter or receiver. The apparatus 120 may comprise a processor 140 (e.g. processing circuit) and computer memory 150. The processing circuit 140 may be any type of logic circuit and the computer memory 150 may be a configuration of one or more memory units.

The apparatus 120 further includes logic 160 stored in the computer memory 150 and executed on the processing circuit 140. The logic 160 is operative to cause the processing circuit 140 to represent, e.g. encode, one or more datasets 172 (received as an input at 110 and stored in memory 150) pursuant to one or more colorspaces and/or colorspace conversions using a colorspace transform and encoding mechanism 180 resulting in encoded datasets 182. In various embodiments, the logic 160 is operative to process and/or receive the one or more datasets 172 as color data at input 110, e.g. process color data received at a transmission medium receiver or transmitted, e.g. a fiberoptic receiver or transmitter, based on the colorspace defining the received data. In various embodiments the logic is operative to receive the one or more datasets 172 as non-color data at input 110 and convert data represented by electrical signals into light signals, where the light signals may represent the data pursuant to a colorspace, and subsequently pursuant to one or more colorspace conversions.

In various embodiments, the logic 160 is further operative to cause the processing circuit 140 to apply a colorspace transform and encoding mechanism 180 to one or more datasets 172, e.g. financial data or information, multimedia data or information, security data or information, or any other data or information that may be suitable for transmission, where datasets 172 may be received as an input at 110 (and stored in memory 150) along a node, e.g. a receiver or transmitter, of a transmission medium, such as a fiber-optic cable. In various embodiments, the colorspace transform and encoding mechanism 180 may process or receive datasets 172 at input 110 according to light signals representing a first colorspace and represented by color-channels associated therewith, e.g. an RGB colorspace, and may convert the first colorspace to a second colorspace, e.g. LAB or XYZ, in order to transform the datasets 172 into encoded (or encrypted) datasets 182, e.g. an encoding takes place based on a converting from a first colorspace to a second colorspace that is different than the first colorspace, and where the conversion to the second colorspace defines the encoding scheme. In various embodiments, the mathematical definition of the second colorspace defines the encoding or encryption scheme in whole or in part, where one or more color-channels of the second colorspace contains provides for and contains the encoded data as one or more light signals transmitted along a fiberoptic line or cable. In various embodiments, more than colorspace conversion and to multiple different colorspaces may take place, where each conversion may (but need not) represent a layer of encryption defined by the mathematical definition of the converted-to colorspace or colorspaces.

In various embodiments, as stated above, the logic 160 may be configured to cause processor 140 to convert datasets 172 from electrical signals into light signals at an input 110, e.g. a fiberoptic transmitter and receiver, where the fiberoptic transmitter or receiver may convert the data according to a colorspace scheme, e.g. RGB channels of an RGB colorspace, and where the colorspace transform mechanism 180 may convert that first colorspace into a second and different colorspace and, in various embodiments, the second colorspace into a third and different colorspace, etc. In various embodiments, whether the datasets 172 were received as electrical signals and converted into light signals with one or more colorspace conversions were performed in association therewith or whether the data were received as light signals with one or more colorspace conversions performed in association therewith, the encoding and colorspace transform mechanism 180 provides for an encoding scheme for compressing and encoding the datasets 172 in a suitable manner for transmission via a transmission medium, such as fiber optic cable.

In various embodiment, one or more colorspace models, and as may be related to one or more colorspace conversions, as described herein may refer to any suitable colorspace model, such as Red-Green-Blue (RGB), Cyan-Magenta-Yellow-Black (CMYK), Luminance-Alpha-Beta (LAB), XYZ, and/or the like, where each channel in the model can represent a bit of data. For example, the Alpha and Beta channels of the LAB colorspace model refer to green-red and blue-yellow color components, respectively. The green-red component may represent a variance between red and green with green in the negative direction and red in the positive direction along an axis and the blue-yellow component may represent a variance between blue and yellow with blue in the negative direction and yellow in the positive direction along an axis. In various embodiments, a predefined range of values associated with each color-channel, e.g. a color value of a color associated with the color-channel, may represent a first bit value, e.g. "1," and a second range of values may represent a second bit value, e.g. a "0," from an encoding scheme perspective. As such, as the number of color-channels is increased, the overall encoding capacity may increase as well.

In various embodiments, a colorspace is associated with one or more color-channels, with various examples of color-channels in relation to individual colorspaces being provided for above and elsewhere herein. In various embodiments, a color-channel is a distribution of colors with a first color and second color of first and second highest prevalence, respectively, where the first color becomes a minimum in the color-channel and the second color becomes the maximum such that the boundary may be a transition between these colors, where this minimum and maximum scheme may be with respect to a colorspace that is converted thereto from another colorspace, e.g. a second colorspace part of a colorspace conversion from a first colorspace. This boundary may be at least one pixel where the color changed from the first to the second color or vice versa. If the first color is set to zero (0) and the second color is set to two hundred and fifty-five (255), then, mathematically, this boundary may be located at pixel(s), light components, or other physical manifestations reflecting of values that jumped between the minimum and maximum color value; for example, there may be sharp division (i.e., thin boundary) in which at least two (or portions of) light-signal representations, or other physical manifestations reflecting the light transition immediately between 0 and 255. In various embodiments, as alluded to above, a range of values within a color-channel may constitute a bit value of "1," e.g. 128-255, and a range of values within a color-channel may constitute a bit value of "0", e.g. 0-127. In various embodiments, color-channels, e.g., "R," "G," and "B" define a colorspace such as RGB (e.g., a first colorspace based on a tristimulus system), and in various embodiments custom color-channels can be created using a (second) tristimulus system associated with and defining an XYZ (second, e.g. converted-to, colorspace).

In various embodiments, a single color-channel may contain more than one bit of data, e.g. at least two distinct bits of data representing at least two colors associated with a color-channel from; for example, if a conversion between a first colorspace containing one or more colors, e.g. red and blue, into a second colorspace takes, then the second colorspace may contain a single color-channel, e.g. purple, that contains data from both color-channels of the first color-channel, e.g. "red" and "blue." Accordingly, in various embodiments, a single color-channel can contain a superposition of information, with values of the color-channel representing more than one bit of data, as the converted-to or second colorspace and associated color-channel(s) may be a combination of colors from the first colorspace each containing or associated with a bit of data. In various embodiments, the superposition of colors into a single color-channel may result in multiple bits along a larger set of values of that color-channel, e.g. a color-channel such as purple may be between 0 and 510, where multiple bits may be represented between the values, e.g. if two colors are represented by purple associated with a converted-to XYZ space (or other suitable colorspace) (from a converted-from colorspace), two bits of data may be represented by the purple channel with four ranges along the range capable of determining a "0" or "1" value for the two bits. In various embodiments, in instances where multiple bits are represented by a color-channel, a cipher and/or key may provide the ordering of the bits, e.g. the order that information is to be sequenced from the ranges of the color-channels (the cipher may provide additional information, e.g. the definition of the colorspace conversion and the ordering or sequencing associated with multiple color-channels).

Accordingly, in various embodiments, the colorspace and encoding mechanism 180 may perform a colorspace conversion from one colorspace, e.g. a first colorspace, such as RGB, representing data sets as a plurality of light signals, into at least one other different colorspace representing an encoded version of the datasets as another plurality of light signals, e.g. lights signals according to a second (or more) colorspace, e.g. XYZ or LAB, such that at least one color-channel of the second colorspace represents at least two colors and/or color-channels associated with the first colorspace. In various embodiments, the conversion or conversions may result in superior compression and encoding for the conversion from datasets 172 into encoded datasets 182 as the encoded data sets 182 are transmitted along the line at least because a single color-channel of the converted-to colorspace or colorspace may represent multiple colors or color-channels from the converted-from colorspace.

In various embodiments, the colorspace and encoding mechanism 180 may be based on multiple colorspace conversions, where a second (or additional) conversion(s) may be done to enhance compression and facilitate superior encoding of the encoded data 182 representing datasets 172 and transmitted along a transmission medium, such as a fiberoptic cable. In various embodiments, the color-channels of any of the colorspaces may be greater than three, e.g. colors that are imperceptible to the human eye can be used provided the fiberoptic transmitter or receiver receiving the transmission is suitable for generating the appropriate light signals and/or is equipped with a receiver for receiving (and decoding the same). In various embodiments, one or more fiber optic transmitters or receivers can implement one or more colorspaces with at least one-thousand or more distinct color-channels and greater or equal to sixty-four bits of data per colorspace, with each color-channel containing encoded information and at least one color-channel containing color-channels from a converted-from colorspace, e.g. information associated with encoded datasets 182.

In various embodiments, as described herein, depending on the hardware and/or software components selected with respect to nodes on the transmission mode, e.g. fiberoptic transmitters or receivers, one colorspace model (e.g. XYZ) may correspond to a higher likelihood of success in terms of being generated, encoded and transmitted by a transmitter and/or detected and decoded than another colorspace. Accordingly, in various embodiments, the colorspace and associated colors selected for the encoding scheme of the datasets 172 can be selected with optimization of encoding, transmitting, scanning, and decoding in mind.

In various embodiments, the logic 160 is further operative to cause the processing circuit 140 to apply an additional encoding mechanism 170 to datasets 172 unrelated to colorspace transformations, prior to or after performing the colorspace conversion and encoding associated with the colorspace transform and encoding mechanism 180. For example, the encoding mechanism 170 may perform PGP encryption on datasets 172 before any component converts them to a light signal and/or before performing any colorspace conversion in association therewith. The additional layer of encryption may further enhance compression and provide additional security for the encoded data 182 as it is transmitted across as transmission medium.

In various embodiments, the logic 160 is further operative to cause the processing circuit 140 to apply a detection and decoding mechanism 190 at any suitable node or point along a transmission medium carrying the encoded data, including at a receiver along a fiberoptic line. The detection and decoding mechanism 190 may cause a receiving device to apply various sensors each associated with the detection of one or multiple color-channels to detect the signal or signals carrying the encode data, where the multiple color-channels are part of the one or more signals carrying the encoded data 182. In various embodiments, not all of the color-channels associated with the light signals carrying encoded data 182 contain the encoded data 182, which may increase the security of the transmission techniques.

In various embodiments, the detection and decoding mechanism 190 may utilize a cipher 188 to decode or decrypt the encoded data 182, e.g. the detection and decoding mechanism 190 may instruct suitable hardware or software components associated with a fiberoptic node, such as a fiberoptic receiver, to decode the encoded data 182.

In various embodiments, the cipher 188 may provide the fiberoptic receiver with (and/or configure the receiver to perform a decoding operation with i) the key defining the one or more colorspace conversions, e.g. mathematical definition of at least one of the colorspaces that are converted to, including a final colorspace of one or more colorspace conversions, and by extension the color-channels that contain or are associated with encoded data 182, including superimposed colors or color-channels associated with a converted-from colorspace, ii) the order or sequencing of information, e.g. color values or range values, of data associated with the color-channels containing the encoded data 182, e.g. the bit order or sequencing of the color values of a particular color-channel iii) the order or sequencing of the color-channels containing the encoded data with respect to one another, e.g. the bit sequence that bits are to be ordered between and amongst color-channels, iv) the timing at which a sensing or detection should occur, e.g. the logic 160 may instruct processor to cause a transmitter to transmit signals with no data for defined or random intervals (or intervals based on a processing threshold at one or more nodes) throughout the transmission line, and as such, the cipher 188 may provide the timing to scan data containing signals actually carrying the encoded data 182, and/or v) any decryption technique that may be applied to a non-colorspace encryption technique applied to datasets 172, such as PGP encryption.

In various embodiments, as stated above, the colorspace conversion from one colorspace to another colorspace forms part of the basis for encrypting, e.g. by the colorspace transform and encoding mechanism 180, the datasets 172 into encrypted or encoded datasets 182, and by extension the decoding or decryption of the encrypted or encoded datasets 182. Accordingly, the encryption or encoding and decryption or decoding, may be based in part on the key or mathematical relationship defining the relevant colors and color-channels of the colorspace and associated with one or more colorspace conversions. For example, if the colorspace scheme associated with the image is an XYZ colorspace, then one or more color-channels of the XYZ colorspace are defined by a tristimulus scheme, that includes at least one chromacity value, e.g. "x", and at least one luminance value, e.g. "y":

$$x=X/(X+Y+Z),$$

$$y=Y/(X+Y+Z),$$

$$z=Z/(X+Y+Z). \quad \text{Equation 1}$$

This means that one or more color-channels are defined by the above equation and can be used to create one or more color-channels in the XYZ colorspace, including colors and color-channels imperceptible to the human eye, and the above equation may also provide, in part, the basis for cipher 188 to allow a component to decode or decrypt the encrypted data 182.

In various embodiments, the encoding may be such that x, y, and z may have certain values that define the particular color-channels associated with the space, and pre-defined color range values within the channel may determine whether the channel represents a "1" or a "0" bit value (or bit values in the instance where a color-channel represents multiple bit values by superimposition). Without knowing the initial x, y, and z values of the various color-channels, decoding the encrypted data 182 may not be possible, and this feature can be amplified, in various embodiments, by having a fiberoptic transmitter transmit light signals that do not contain or are not associated with any data (encoded or otherwise). Accordingly, the equations governing the particular colorspace, of which the above is one example and for one colorspace conversion or conversions, provide the basis for encoding the datasets 172 into encoded data 182 suitable for transmission along a transmission medium, such as fiberoptic cable, and also the basis for decoding encoded data 182 at a suitable point along the transmission medium, such as a fiberoptic receiver.

Accordingly, one node of a transmission medium associated with input 110, e.g. a fiberoptic transmitter, may be configured by apparatus 120 to encode one or more datasets 172 using the mathematical relationship governing a colorspace, e.g. Equation 1, which in turn determines, in part or in whole, a cipher 188 that can decode or decrypt the encoded data 182 at an output 130, e.g. a fiberoptic receiver, which can decode or decrypt the encoded data based on the mathematical relationship or key, e.g. Equation 1, defining the colorspace conversion.

In various embodiments, cipher 188 is an alternating cipher 188 that may be dynamically updated by the colorspace transform and encoding mechanism 180 during each transmission of data or during a predefined interval. The update may include any modification that changes the relevant information necessary for decryption or decoding (e.g. changing the nature of encoding or encryption) including i) changing which color-channels of the converted-to colorspace contain the encoded data 182, ii) changing the nature, if any, of any superimposition of a converted-from colorchannel or color as represented in the color-channels of the converted-to color-channels, iii) changing the order or sequencing of information, e.g. color values or range values, of data associated with the color-channels containing the encoded data 182, e.g. the bit order or sequencing of the color values of a particular color-channel, iv) any encryption applies to the encoded data 182 based on a non-colorspace encryption technique applied to datasets 172, such as PGP encryption, including changing or eliminate the non-color based encryption, v) changing the timing at which a sensing or detection should occur (based on a timing or processing threshold at a node, vi) changing the range values of one or more color-channels contained or associated with encoded data 182 by performing a mathematical operation on value ranges of the one or more color-channels, such as an addition, multiplication, division or other suitable operation that would affect the range values defining bit values in that color-channel or color-channels, vii) using a completely different colorspace conversion to represent a first transmitted portion of encoded datasets 182, e.g., a portion of datasets 172 are associated and transmitted with a colorspace conversion that culminates in the XYZ space and a subsequent transmission is governed by a different culmination (and by extension a different mathematical equation or key defining the conversion and converted-to colorspace) of a colorspace conversion, e.g. LAB, with respect to another portion of datasets 172 as represented by another portion of encoded datasets 182. For example, a portion of datasets 172 may be encoded and form a portion of encoded dataset 182 and transmitted based on a first set of one or more colorspace conversions and transmitted along the transmission medium, such as a fiberoptic cable, and another portion of datasets 172 may be encoded pursuant to a different one or colorspace conversions performed by the colorspace transform and encoding mechanism 180.

In various embodiments, the detection and decoding mechanism 190 may update the cipher 188 when the encoding mechanism and 180 changes the encryption technique with the relevant key, e.g. mathematical relationship defining the converted-to colorspace, thus permitting proper decoding and decryption at output 130, e.g. fiberoptic receiver, of the transmission medium, e.g. fiberoptic line or cable.

In various embodiments, and as discussed in more detail with respect to one or more embodiments provided below, if the initial or subsequent (in instances where multiple colorspaces and conversions thereto or therefrom are used) colorspace has a luminance factor, such as an XYZ colorspace, the luminance factor may be temporarily filtered out when determining the various chromacity values desired for use with encoded datasets 182.

In various embodiments, the luminance factor, e.g. "y" of Equation 1, may be reintroduced (or used from the outset if it was never filtered out), to define tangential information related to the encoded data 182, such as an error correcting code, e.g. Hamming code. Accordingly, in various embodiments, logic 160 may be further operative to cause the processing circuit 140 to configure the colorspace conversion and encoding mechanism 180 to encode tangential data based on a brightness value of transmitted light signals e.g. a range of brightness values correspond to a "1" bit value (brightness higher than or equal to a certain value) and a range of values correspond to a "0" bit value (brightness less than a certain value). In various embodiments, logic 160 may be further operative to cause the processing circuit 140 to configure the detection and decoding mechanism 190 to cause a suitable node along a transmission line, such as a fiberoptic receiver, to associate particular data distinct from the datasets 172 (and by extension encoded datasets 182) in relation to the luminance value (brightness or light strength of a transmitted signal carrying one or more color-channels with encoded datasets 182).

In various embodiments, the logic 160 is further operative to cause the processing circuit 140 to identify which colorspace model to use in encoding and transmitting a given image prior to the colorspace transformation and encoding mechanism 180 performs the encodings, e.g. optimizing which colorspace conversion to perform based on the capabilities of the hardware, e.g. transmitting and sensing devices of the nodes along the transmission medium. For example, the logic 160 is further configured to cause the processing circuit 140 to apply the colorspace transformation and encoding mechanism 180 to transform datasets 172 into encoded datasets 182 by converting from one colorspace representing datasets 172, e.g. RGB, into another colorspace model (e.g. XYZ), where the other or second colorspace model has a higher likelihood than the first colorspace model at detection at an output node, e.g. output 130 as a fiberoptic receiver. It is appreciated that the other colorspace model may be any colorspace model including those with a different number of channels than the first colorspace model.

The one or more colorspace models as described herein, as stated and implied elsewhere herein, refers to any suitable colorspace model, such as colorspace employing a tristimulus system or scheme, the Red-Green-Blue (RGB), the Luminance-Alpha-Beta (LAB), an XYZ colorspace, and/or the like and/or variations of the same. Similarly, although various embodiments may refer to a particular conversion from one specific colorspace to another specific colorspace, conversions between other colorspaces are contemplated and consistent with the teachings of the present disclosure.

Figure 2:
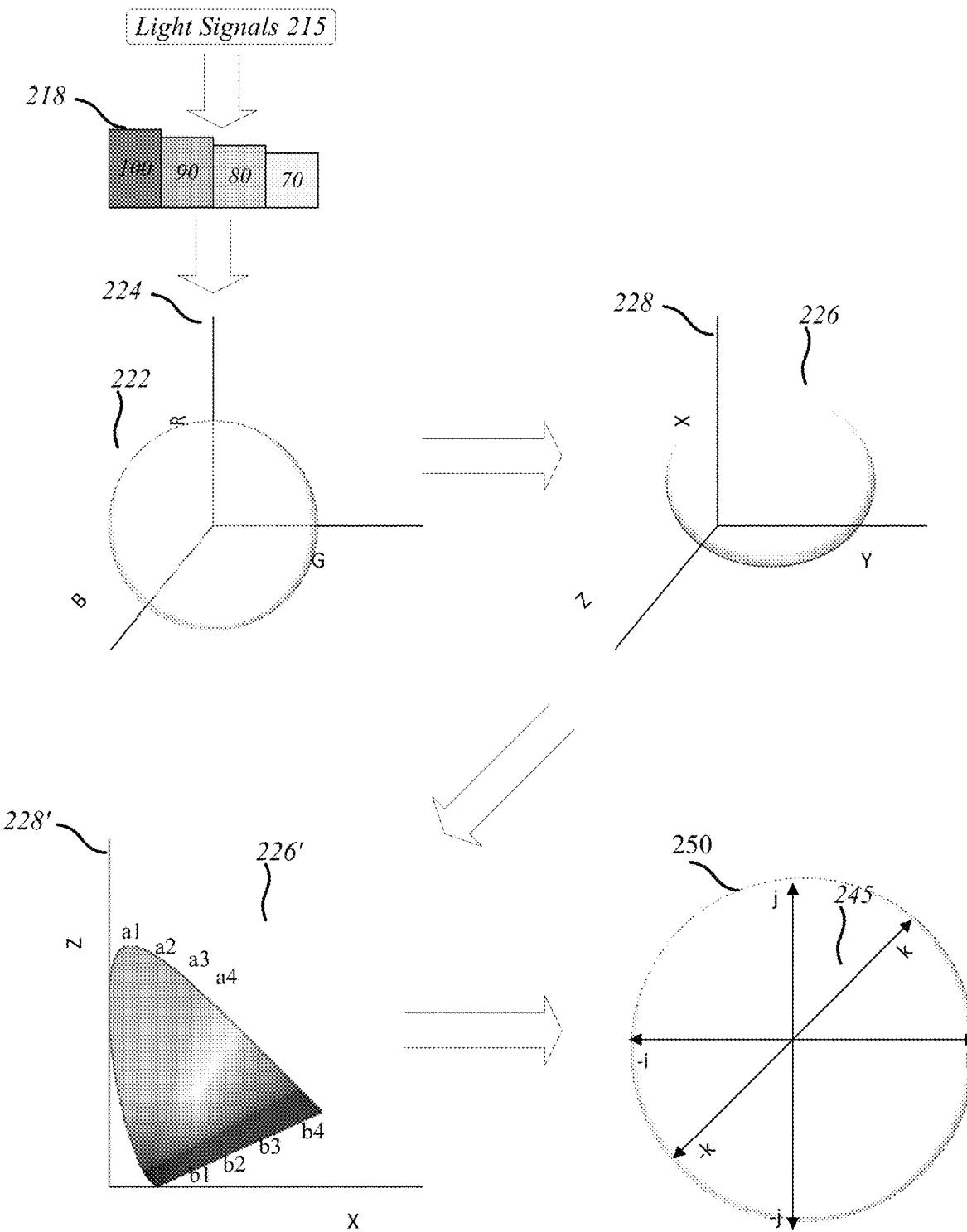
FIG. 2 illustrates an embodiment of a colorspace conversion technique useful for encoding and/or decoding data, including by the system of FIG. 1, and in accordance with at least one embodiment of the present disclosure.

FIG. 2 illustrates an example of a colorspace conversion scheme 200 in accordance with various embodiments of the present disclosure. It is to be appreciated that the below example is non-limiting and different colorspaces may constitute the initial colorspace that will constitute a converted-from colorspace and a final colorspace that may constitute a converted-to colorspace. Moreover, multiple conversions may take place, and with respect to different colorspace models. For example, although the below example is from an RGB colorspace to an XYZ colorspace, alternate embodiments are envisioned where an RGB colorspace is converted to a LAB colorspace or to a first XYZ colorspace, which is then converted to a second XYZ colorspace, with any number of variations and between different colorspaces envisioned as alternative embodiments herein.

A graphical representation 218 of a particular light scheme governing light signals 215 that provide an original representation of one or more datasets, e.g. 172, is provided (where the numbers 100, 90, 80, and 70 are intended to represent a simplified version of colors distribution values of one or more colors representing the light signals 215). The graphical representation 218 can be generated by having one or more components of system 100 facilitate detection of the light signals 215 along a transmission medium and generating the graphical representation 218 of the most prevalent colors, least prevalent colors, or absent colors associated with the light signals 215. In one or more embodiments, the graphical representation 218 can be of four, six, eight or more colors of the most prevalent colors of light signals 215. Since various embodiments of the present disclosure expressly contemplate using colors imperceptible to the human eye, there is no limitation on the number of colors that can be used with respect to the graphical representation 218, the colorspace conversions discussed herein, or any light signals generated or detected based on the colorspace conversions (thousands of color-channels are contemplated with respect to any of the colorspace models and colorspace conversions according to various embodiments of the present disclosure, provided suitable transmitters and receivers are utilized in accordance with one or more embodiments of the present disclosure).

In various embodiments, one or more components of system 100 can determine the most prevalent colors associated with light signals 215, and the resulting graphical representation 218 may be based on that determination. The graphical representation 218 may be used to map the most prevalent colors to a distribution 222 associated with a colorspace 224 that is associated with the light signals 215 carrying an initial set of data, e.g. datasets 172, including but not limited to an RGB colorspace 224. In various embodiments, the colors of the graphical representation 218 are mapped pursuant to the tristimulus values of the RGB colorspace, e.g., "R," "G," and "B," which formed the basis of the light signals 215 representing data along a fiberoptic cable or line. Any suitable mathematical conversion, e.g., linear-algebraic, etc. can be used to map the conversion to the RGB colorspace, e.g., convert the mapped RGB colorspace to another colorspace.

In various embodiments, once the distribution 222 is mapped according to the RGB colorspace 224, one or more components of system 100 may convert the RGB distribution 222 to a new colorspace 226 with a distribution 228 pursuant to the new colorspace 226, where the conversion represents an encoding of the data associated with light signals 215. Any suitable colorspace conversion can be used, including converting to an XYZ colorspace, where the conversion can be pursuant to any suitable mathematical conversions and equations that govern the XYZ colorspace, including suitable tristimulus conversions between RGB and XYZ. In various embodiments, "Y" represents a luminance value of the XYZ space and at least one of "X" and "Z" (or both) represent a chrominance value of the colorspace and an associated distribution, e.g. 226 plotted pursuant to the XYZ colorspace.

In various embodiments, the color-channels of new colorspace 226 may represent one or more bits of data for an encoded representation of data associated with light signals 215. In various embodiments, the encoding is limited to the second conversion, e.g. only the color-channels of new colorspace 226 provide for an encoded representation of data. In various embodiments, additional colorspace conversions (not shown) may be performed as a basis of further encoding and/or the data associated with light signals 215 were already encoded pursuant to a non-colors scheme method of encryption, such as PGP encryption.

In various embodiments, the luminance channel "Y" is filtered out resulting in colorspace 228' and distribution 226', which may assist in making determinations solely on actual chromatic values associated with the light signals 215, without considering luminance (this is helpful at least because colors can be used that are imperceptible to the human eye). In various embodiments, four (or more) lines can be defined by points (a1, b1), (a2, b2), (a3, b3), and (a4, b4). In various embodiments the four (or more) lines defined by points (a1, b1), (a2, b2), (a3, b3), and (a4, b4) are selected to have a maximum distance apart with respect to distribution 226'. In various embodiments, the points a1, a2, a3, and a4 are selected to correspond to the most prevalent colors associated with light signals 215 and b1, b2, b3, and b4, and by extension, being opposite to those colors, may represent the least prevalent or absent colors in association with the light signals 215. These lines may define vectors for a new colorspace conversion in an XYZ or other suitable colorspace 2450 and may form the basis for new XYZ tristimulus values.

In various embodiments, at least one color-channel of the colorspace 250 may have a range of values that begins with a least prevalent color in relation to the colors of the light signals 215, but that also includes within that range of values multiple prevalent colors of light signals 215 carrying data, thus permitting for a superimposition of color-channels containing data that were part of or associated with light signals 215, and by extension a compression and encoding of the data carried by light signals 215, which is then transmittable as encoded data via a suitable transmission medium, such as a fiberoptic cable or line A new set of light signals may be generated by a suitable device, such as a fiberoptic transmitted, based on colors associated with a new colorspace 250 and a distribution 245 of colors defined by color-channel vectors (i,-i), (j, -j), (k, -k), an additional color-channel and all other color-channels (omitted from display due to the limitations of three-dimensional space) associated therewith.

Accordingly, in various embodiments, the color-channels of new colorspace 250 may represent one or more bits of data for an encoded representation of data as light signals along a transmission medium, e.g. fiberoptic line or cable, where at least one color-channel contains multiple colors from a converted-from colorspace, e.g. colorspace 222, in a superimposed scheme, e.g. a single color representing a combination of colors associated with the converted-from colorspace 222.

In various embodiments, whether luminance channel "Y" is filtered out or whether it remains unfiltered throughout one or more colorspace conversions, it may be used to provide an encoded representation of tangential information in relation to the encoded data, such as party bits (Hamming code). In various embodiments, where the luminance channel "Y" is filtered out in relation to colorspace 228', it can be reintroduced at any subsequent conversion when chromacity values have been determined, such as with respect to new colorspace 250, in order to provide for the luminance encoding feature in association with tangential information.

In various embodiments, when performing the colorspace conversion between 228' and 250, in addition to carrying out the algebraic or other suitable conversions associated with the XYZ colorspace, the color-channel vectors, e.g. (i,-i), (j, -j), (k, -k), may be orthogonal to one another by performing any suitable mathematical and/or orientation operation on the vectors and/or by selecting suitable points on colorspace 228' and distribution 226' when making the conversion. In various embodiments, a second maximum difference between one or more points can be taken in space 250, in addition to an orientation operation to center the distribution 245 along the axis of the newly defined color-channel vectors, e.g. (i,-i), (j, -j), (k,-k), such that the color-channel vectors are orthogonal and have a maximum distance in relation to one another.

In various embodiments, as stated and implied above, the various color-channels described above, including each vector, e.g. (-i, i), defines a first color that is a minimum in the color-channel and the second color becomes the maximum, such that the boundary may be a transition between these colors, where a minimum and maximum color-channel value may be provide a range of values for encoded data to be contained in the color-channel, including containing more than one color or color-channel from a converted-from color-channel, and transmitted by a suitable transmission medium, such as a fiberoptic cable or line.

The length of the color-channel can be adjusted accordingly based on the capabilities of the scanning and image-acquiring abilities of the various components of the system 100 and the nodes of the transmission medium, e.g. fiberoptic transmitter and/or receivers.

In various embodiments, the conversions between the RGB colorspace to the XYZ colorspace and/or a first converted-to (derivative) XYZ space to another XYZ colorspace can be governed by the tristimulus equations (Equation 1) that define the converted colorspace and a distribution of colorspace, where the value of x+y=z can be normalized to 1.

In various embodiments, the value of "X," "Y," and "Z," is dependent on the input colors from the RGB colorspace (or in the case of a second conversion, from the converting colorspace). Although the tristimulus values are three be definition, as noted above, the conversion can involve more than three color-channels, including color-channels that define colors imperceptible to the human eye. In various embodiments, the conversion governed by Equation 1 may form a key for an encoding mechanism to encrypt and encode data and carry the encoded information along a transmission medium and for a decoding mechanism to decrypt and/or decode the encoded information, where the mechanisms for encoding and decoding may be one or more components of system 100 in communication with components of a transmission medium, e.g. fiberoptic transmitters and/or receivers.

In various embodiments, since fiberoptic transmitters and receivers may transmit and receive, respectively, thousands of colors and color-channels, a significant amount of information may be transmitted according to one or more of the techniques discussed herein (at least one thousand or more distinct color-channels may be used with a colorspace conversion, e.g. second or subsequent colorspace representing sixty-four bits or more of data), as a single color-channel may be a superimposition of more than color associated with a bit of data. In various embodiments, another benefit is offering a manner to securely encode information, e.g. without knowing the equation or equations of what color-space govern and without knowing the input values (which are based on the first colorspace associated with the light signals 215), a successful decoding or ascertaining of encoded information pursuant to a colorspace conversion may not be possible, which, in various embodiments, may become effective as color-channels and colors unassociated with data are transmitted as part of the light signals carrying the encoded data.

Figure 3:
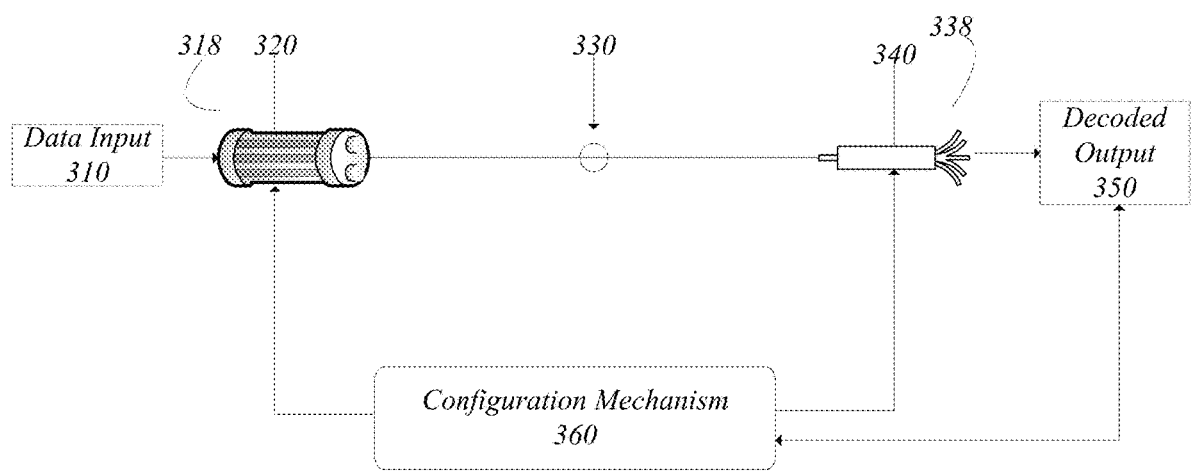
FIG. 3 illustrates an embodiment of a transmission medium system that can be used to transmit encoded data and/or decode encoded data in accordance with at least one embodiment of the present disclosure.

FIG. 3 illustrates an embodiment of a transmission medium system 300 that can be used to transmit encoded data and/or decode encoded data, where in one embodiment the transmission medium system 300 is a fiberoptic system 300. In various embodiments, the fiberoptic system 300 includes at least two nodes 318 and 338 along a fiberoptic cable or line 330, where one node 318 is associated with at least one fiberoptic transmitter 320 and one node 338 is associated with at least one a fiberoptic receiver 340. The fiberoptic transmitter 320 and the fiberoptic receiver 340 may be controlled or configured by a configuration mechanism 360 that includes one or more components for implementing at least one functionality of system 100. In various embodiments, the fiberoptic transmitter 320 may also be configured to perform the functionality of a fiberoptic receiver and/or include a fiberoptic receiving device as part of the overall node 318, and in various embodiments the fiberoptic receiver 340 may also be configured to perform the functionality of fiberoptic transmitter and/or include a fiberoptic transmitting device as part of the overall node 338. In various embodiments, the configuration mechanism 360 may be a satellite, server, or any other suitable mechanism that may remotely control a computer device over a wireless network, e.g. internet or intranet, and/or a suitable mechanism that controls the fiberoptic transmitter 320 and fiberoptic receiver 340 via a direct wired connection made by any suitable wired connection, e.g. fiberoptic (a separate fiberoptic connection or as part of cable 330), electrical, etc.

In various embodiments, the fiberoptic transmitter 320 receives a data input 110 at node 318, where the data input may include financial data or information, multimedia data or information, security data or information, or any other data or information that may be suitable for transmission. The data input 110 may be in the form of electrical signals, and the fiberoptic transmitter may detect the electric signals and communicate with the configuration mechanism 360. The configuration mechanism 360 may perform a series of conversion and encryption operations on the data input 110. In various embodiments, the configuration mechanism 360 may perform one or more operations to generate a first colorspace model representing the data input 110, where the first colorspace model may include one or more colors that can be generated and transmitted by the fiberoptic transmitter 320.

In various embodiments, the data input 110 received by the fiberoptic transmitter 320 is in light signal format suitable for transmission along fiberoptic line or cable, e.g. 330, and the fiberoptic transmitter detects the various signals associated with the data input 110 using any number of suitable sensors configured to detect colors associated with those signals. In various embodiments, the configuration mechanism 360 may determine a first colorspace model based on the incoming light signals associated with the incoming data input 110, e.g. if the light signals are one or more of "red," "blue," and "green," signals, then the first colorspace model may be an RGB colorspace model, although this is merely exemplary, and any colors or light channels associated with other models discussed herein may constitute the colors of the incoming light signals of data input 110 and, e.g. LAB, XYZ, etc.

In various embodiments, once the configuration mechanism 360 determines a first colorspace for the data input 110, then it may perform one or more colorspace conversions to encode the data input 110 into encoded data. The colorspace conversions may to establish the encoding may be any suitable colorspace conversions and models as discussed herein. In various embodiments, before or after the configuration mechanism provides a colorspace encoding scheme, it can apply an additional encryption, e.g. a non-color encryption technique such as PGP encryption, to the incoming data input 310, so as to add an additional layer of compression and security to the encoded representation of data input 110. In various embodiments, the key for decrypting the encoded representation of data input 110 may be the mathematical definition defining the second colorspace (or the final colorspace and relevant intermediary colorspaces if multiple conversions are performed), in addition to an appropriate decrypting scheme, key, or information associated with the non-color-based encryption, e.g. PGP encryption, all of which may be transmitted to the fiberoptic receiver 340 so that it may decode a transmission associated with this type of encoding scheme.

In various embodiments, once the configuration mechanism 360 determines the colorspace model and conversions that will govern the transmission, it may instruct the fiberoptic transmitter 320 to transmit light signals pursuant to the color and encoding scheme and transmit such that the generated light signals represent an encoded version of data input 110 and are transmitted through the fiberoptic line 330. In various embodiments, the configuration mechanism 360 may utilize a colorspace transformation that is optimized for detection and transmission based on the sensor and other technical capabilities of the fiberoptic transmitter 320 and fiberoptic receiver 340, e.g. the configuration mechanism 360 will not select colors or associated colorspaces that are associated with colors that cannot be sensed by the fiberoptic receiver 340 and/or generated by the fiberoptic transmitter 320. In various embodiments, a parity check or Hamming Code may be based on a luminance value, e.g. a brightness value associated with the plurality of light signals, the range values of which may also be provided to the fiberoptic receiver 340. In various embodiment, the colorspace encoding may include at least one of i) an infrared channel and ii) an ultraviolet channel, where in various embodiments, either one or both the infrared and/or ultraviolet channel may represent superimposed ultraviolet and/or infrared variations, respectively, from the first-colorspace.

In various embodiments, the configuration mechanism 360 may provide, as stated above, the fiberoptic receiver 340 with the decryption and encoding information required to decrypt the encoded signals traveling down the line, including the mathematical definition governing any colorspace conversions, and by extension, the information required to identify which color-channels contain encoded information, including ultraviolet and infrared channels. In various embodiments, the fiberoptic receiver 340 may activate relevant sensors required to read the relevant color-channels and the configuration mechanism 360 may instruct the receiver 340 to sequence the bits of the color-channel pursuant to a cipher (discussed in greater detail with respect to FIG. 4) or other suitable mechanism, resulting in decoded output 350. In various embodiments, the decoded output 350 may be provided to any suitable computing device, including being fed back to configuration mechanism 360 for verification and/or for transmission to another node and/or device.

One or more devices at input node 318, node 320, node 340 and output node 338 may, in addition to a relevant fiberoptic transmitter and receiver, include any electronic device capable of receiving, processing, and sending information for the system 100 and/or for configuration mechanism 360. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. In various embodiments, the above components and/or functions are part of one or more of the configuration mechanism 360 and/or any fiberoptic transmitters and/or receivers at nodes 320 and 340. The embodiments are not limited in this context.

In various embodiments, one or more devices at input node 318, output node 338, node 320, and node 340 may execute instructions, processing operations, or logic for the system 100 using one or more processing components, and in lieu of or in conjunction with configuration mechanism 360 and/or the fiberoptic transmitters and receivers. The processing components at the nodes may comprise various hardware elements, software elements, or a combination of both. Examples of hardware elements may include devices, logic devices, components, processors, microprocessors, circuits, processing circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. In various embodiments, the above components and/or functions are part of one or more of the configuration mechanism 360 and/or any fiberoptic transmitters and/or receivers at nodes 320 and 340. The embodiments are not limited in this context.

In various embodiments, one or more devices at input node 318 and output node 338, including but not limited to the fiberoptic transmitters and/or receivers and configuration mechanism 360, may execute communications operations or logic for the system 100. The communications components may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 4:
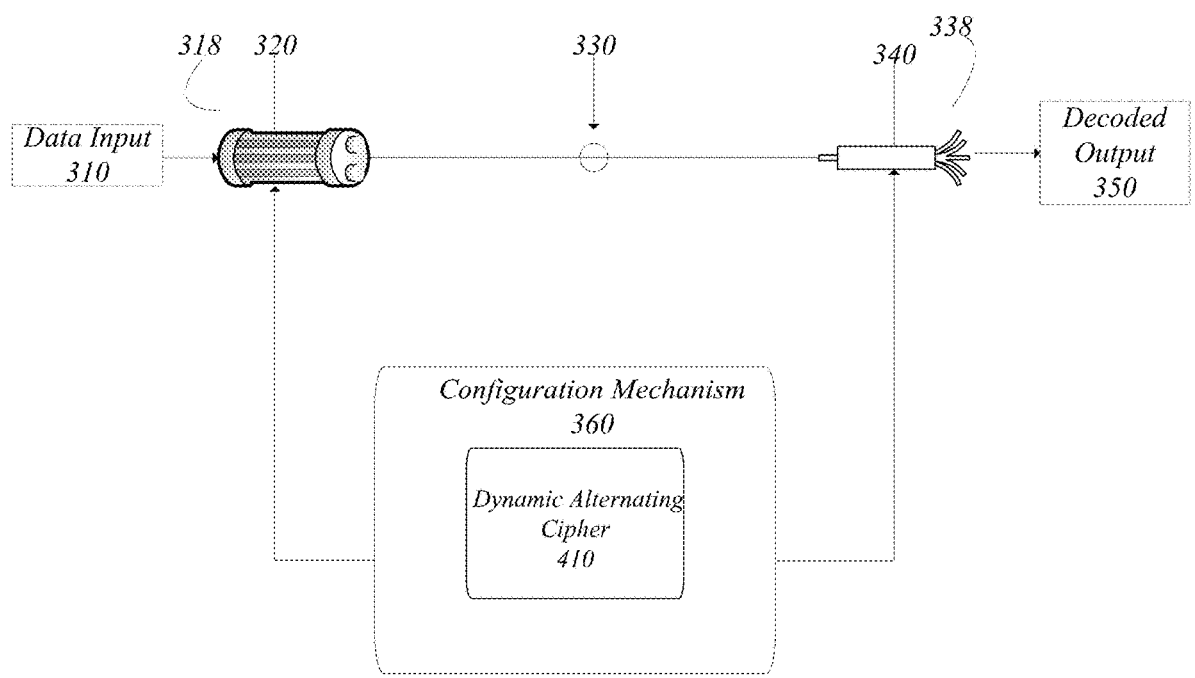
FIG. 4 illustrates an embodiment of a transmission medium system that can be used to transmit encoded data and/or decode encoded data in accordance with at least one embodiment of the present disclosure.

FIG. 4 illustrates the a fiberoptic transmission medium 400 such as that of FIG. 3 with a dynamic alternating dynamic cipher 410 part of the configuration mechanism 360. The dynamic alternating cypher may be configured to automatically change the colorspace and encoding scheme applied to incoming data input sets 310 based on a time interval, a threshold of an amount of data processed, or any other threshold that may be assessed automatically. The configuration mechanism 360 may then update modifications required to the encoding at the input 310 and relay the update information associated with the cipher 410, including colorspace modifications, to the fiberoptic receiver 340, such that the receiver 340 may decrypt a subsequent transmission based on the modification and/or update producing decrypted 350. The cipher 410 may provide components at nodes 320 and 340, including a fiberoptic transmitter or receiver, with information related to: i) the key defining the one or more colorspace conversions ii) the order or sequencing of information, e.g. color values or range values, of data associated with the color-channels containing an encoded representation of datasets 310, e.g. the bit order or sequencing of the color values of a particular color-channel iii) the order or sequencing of the color-channels containing the encoded representation of datasets 310 with respect to one another, e.g. the bit sequence that bits are to be ordered between and amongst color-channels, iv) the timing at which a sensing or detection should occur based on a timing or processing threshold and/or v) any decryption technique that may be applied to a non-colorspace encryption technique applied to datasets 172, such as PGP encryption.

In various embodiments, the dynamic cipher 410 automatically changes one or more aspects of the encryption associated with a transmission at a node, and the configuration mechanism 360 may update the fiberoptic transmitter may include any modification that changes the relevant information necessary for decryption or decoding (e.g. changing the nature of encoding or encryption) including i) changing which color-channels of a colorspace contain the encoded data, ii) changing the nature, if any, of any superimposition of color-channels from a first colorspace as reflected and/or represented in a second colorspace, iii) changing the range values of one or more color-channels contained or associated with encoded data representing any portion of data input sets 310 by performing a mathematical operation on value ranges of the one or more color-channels, such as an addition, multiplication, division or other suitable operation that would affect the range values defining bit values in that color-channel or color-channels, iv) the timing at which a sensing or detection should occur (based on a timing or processing threshold) and/or v) using a completely different colorspace conversion to represent a first transmitted portion of an encrypted datasets 310, e.g. a portion of datasets 310 are associated and transmitted along line 330 by the transmitter 320 with a colorspace conversion that culminates in one colorspace and, with respect to another portion of datasets 310 as represented by another portion of encoded dataset transmissions along line 330, a subsequent transmission is governed by another colorspace conversion culminating in another and different colorspace.

Accordingly, various embodiments provided for by FIG. 3 and FIG. 4 provide for one or more fiberoptic systems for transmitting, encoding, and decoding data pursuant to one or more colorspace schemes, where various embodiments add a layer of non-colorspace encoding techniques in the encoding of the data, and where various embodiments provide for an alteration of the encoding (and by extension decoding) based on an alternating cipher that adjusts the encoding at the input of the system and the decoding at the output of the system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art may understand and appreciate that a methodology could alternatively be represented as a series of interrelated states or events, such as in a state diagram. Moreover, not all acts illustrated in a methodology may be required for a novel implementation.

Figure 5:
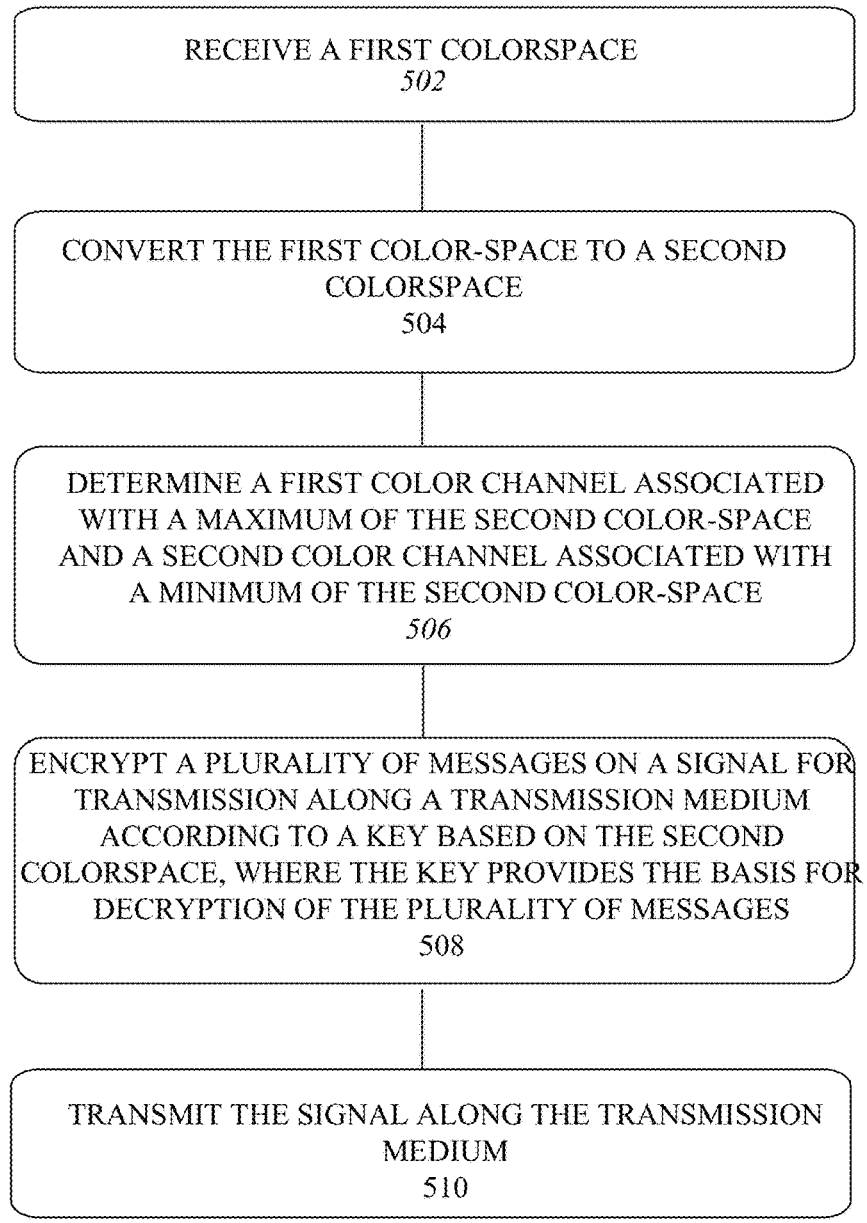
FIG. 5 illustrates an embodiment of a first logic flow for the system of FIG. 1 in accordance with at least one embodiment of the present disclosure.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 receives a first colorspace 502, where the first colorspace may be a representation of data any suitable data including but not limited to financial data or information, multimedia data or information, security data or information, messages concerning any of the previously mentioned items, or any other data or information that may be suitable for transmission. For example, the logic flow 500 may receive a representative dataset represented according to a colorspace and/or it can receive data that is not represented as a colorspace and convert the data into a first colorspace representation.

The logic flow 500 may convert the first color-space into a second color-space using any suitable colorspace conversion technique as described herein, including determining an optimal colorspace suitable for transmitting data in relation to any suitable transmission medium, including a fiberoptic transmission system, and converting the first colorspace to the second colorspace based on the determination 504.

The logic flow may determine a first-channel associated with a maximum point of the first colorspace and a second color-channel associated with a minimum of the second color-channel 506. The maximum and minimum points may be selected based on the optimum colors that are suitable for transmission based on the scanning and other functional capabilities of a transmission medium for transmitting data based on the colorspace conversions, e.g. a fiberoptic transmission system.

The logic flow may encrypt a plurality of data, e.g. messages, on a signal for transmission along a node of a transmission medium, such as a fiberoptic cable, according to a key based on the second colorspace, where the key may also provide the basis for decryption of the plurality of messages 508. In various embodiments, the key is the mathematical definition of the second colorspace, and it includes the definition of the minimum and the maximum color-channels referenced in 506. Part of the encryption may include encrypting data between the minimum color-channel and maximum color-channel of the second color-channels, e.g. colors in between the minimum and maximum color-channels of the second colorspace, in addition to other color-channels of the second colorspace. The one or more colors associated with the one or more color-channels may be indicative of a bit of data and/or multiple bits of data, as a single color-channel may include colors from the first colorspace that are combined into a single color in a color-channel of the second colorspace. In various embodiments, since the components of fiberoptic systems may include the ability to utilize hundreds of thousands of colors, including colors unseen by the human eye each with multiple bits of data represented by colors that are associated with color-channels from the first colorspace, e.g., the encoding may employ a thousand or more color-channels and the second colorspace may exceed sixty-four bits of encoded data per transmission.

Accordingly, the amount of data that may be transmitted is increased, in addition to enhancing security associated with the transmission. In various embodiments, the encryption may also include performing a non-colorspace encryption, such as PGP encryption, before or after the colorspace conversions are performed on the data or messages. In various embodiments, the encoding scheme may include one or all of an ultraviolet layer indicative of a bit of message data, an infrared layer indicative of a bit of message data, and/or a luminance channel (brightness level of a fiberoptic signal or signals carrying the encoded messages) indicative of tangential data, such as a parity check (Hamming Code).

The logic flow 500 may employ any suitable series of colorspace conversion, compression, and encoding techniques as discussed herein to perform any one or more of the operations provided for above.

The logic flow may transmit the encoded messages to another node of the transmission medium, e.g. a fiberoptic cable, using any suitable transmission technique.

Figure 6:
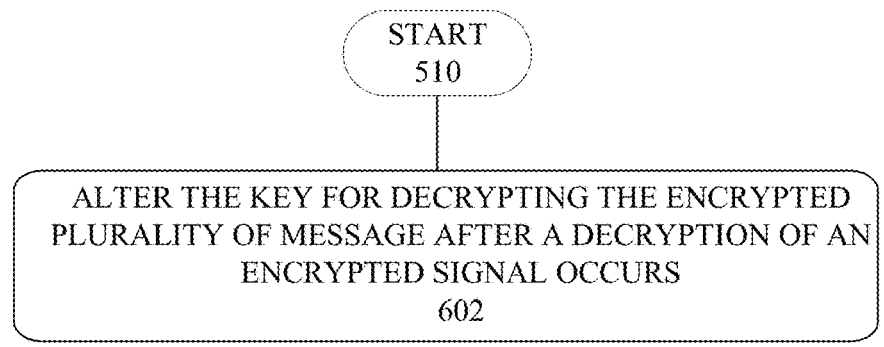
FIG. 6 illustrates an embodiment of a second logic flow for the system of FIG. 1 and in accordance with at least one embodiment of the present disclosure.

FIG. 6 illustrates one embodiment of a logic flow 600. The logic flow 600 may be representative of some or all of the operations executed by one or more embodiments described herein.

The logic flow 600 may start at operation 510 of logic flow 500. The logic flow may alter the key for encrypting and decrypting additional messages or data along the transmission medium, e.g. fiberoptic cable, after at least one transmission of encoded data takes place at a node of the transmission system 602. The logic flow may perform the alteration using a cipher, where the cipher may alter the encryption by i) changing which color-channels of the second colorspace that contain the encoded data, ii) changing the nature, if any, of any superimposition of color-channels from the first colorspace as reflected and/or represented in the second colorspace, iii) changing the range values of one or more color-channels contained or associated with encoded data representing any portion of the messages or data associated with the encryption by performing a mathematical operation on value ranges of the one or more color-channels of the second colorspace, such as an addition, multiplication, division or other suitable operation that would affect the range values defining bit values in that color-channel or color-channels of the second colorspace, iv) the timing at which a sensing or detection should occur (based on a timing or processing threshold) with respect to the decryption or encryption of the data or messages and/or v) using a completely different colorspace conversion to represent a first transmitted portion of the messages than another colorspace conversion for a second portion of the transmitted messages, e.g. the first-to-second colorspace conversion is used in one instance and a completely different colorspace conversion, e.g. a first-to-third colorspace conversion, is used for another portion of the transmission.

FIG. 7 illustrates one embodiment of a logic flow 700. The logic flow 700 may be representative of some or all of the operations executed by one or more embodiments described herein. The logic flow may receive an encrypted signal via a transmission medium, e.g. a fiberoptic cable, at a receiving location or node of the transmission medium at step 710, where the encrypted signal contains data encrypted based on a conversion from a first color-space to a second color-space 705. The encryption may be pursuant to any encryption technique described herein, including in various embodiments associated with the logic flows of FIG. 5 and FIG. 6.

The logic flow may decrypt the received encrypted signal at a node of the transmission medium, e.g. fiberoptic cable, where the decryption is based on an encryption and decryption cipher, and where the encryption and decryption cipher is based on the second colorspace 715. The second colorspace may be a colorspace associated with a conversion from a first colorspace using any suitable technique as described herein. The encryption and decryption cipher may include a key that defines the conversion to the second colorspace and provides the basis for decrypting or decoding the encoded signal. The encryption and decryption cipher may also include the basis for decrypting ultraviolet and/or infrared channels with encrypted information and/or tangential information, such as a parity check (Hamming Code) as represented by a luminance channel (e.g. brightness of a fiberoptic signal). Since fiberoptic cables and systems can employ thousands of colors in the transmission process, a thousand or more color-channels may be employed and the second colorspace may exceed sixty-four bits of encoding data carrying capacity in relation to the transmitted and encrypted signal, and as such, the decryption or decoding of the same may involve a decoding and decryption of more than one thousand color-channels and more than sixty-four bits of encoded data per transmission.

The logic flow may store the decoded or decrypted signal or signals in any suitable storage system, computer processor with storage capacity, and/or any other computer device as identified herein or as otherwise may be suitable for the task.

Figure 8:
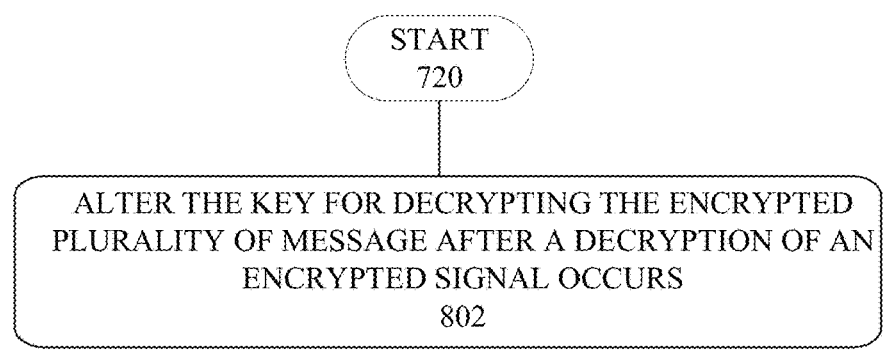
FIG. 8 illustrates an embodiment of a fourth logic flow for the system of FIG. 1 and in accordance with at least one embodiment of the present disclosure.

FIG. 8 illustrates one embodiment of a logic flow 800. The logic flow 800 may be representative of some or all of the operations executed by one or more embodiments described herein.

The logic flow 800 may start at operation 720 of logic flow 700. The logic flow may alter the key for encrypting and decrypting additional messages or data along the transmission medium, e.g. fiberoptic cable, after at least one decoding of transmitted encoded data takes place at a node of a suitable transmission system, such as fiber optic cable 802. The logic flow may perform the alteration using a cipher, where the cipher may alter the encryption (and by extension the basis for decryption) by i) changing which color-channels of the second colorspace that contain the encoded data, ii) changing the nature, if any, of any superimposition of color-channels from the first colorspace as reflected and/or represented in the second colorspace, iii) changing the range values of one or more color-channels contained or associated with encoded data representing any portion of the messages or data associated with the encryption by performing a mathematical operation on value ranges of the one or more color-channels of the second colorspace, such as an addition, multiplication, division or other suitable operation that would affect the range values defining bit values in that color-channel or color-channels of the second colorspace, iv) the timing at which a sensing or detection should occur (based on a timing or processing threshold) with respect to the decryption or encryption of the data or messages and/or v) using a completely different colorspace conversion to represent a first transmitted portion of the messages than another colorspace conversion for a second portion of the transmitted messages, e.g. the first-to-second colorspace conversion is used in one instance and a completely different colorspace conversion, e.g. a first-to-third colorspace conversion, is used for another portion of the transmission. In various embodiments, once the changes to the encryption are performed, the logic flow 800 may deliver the changed encryption basis information, e.g. colorspace key, to a suitable node that can perform a decryption along the transmission medium, e.g. fiberoptic cable, and the decoding or decryption may take place at the suitable node.

Figure 9:
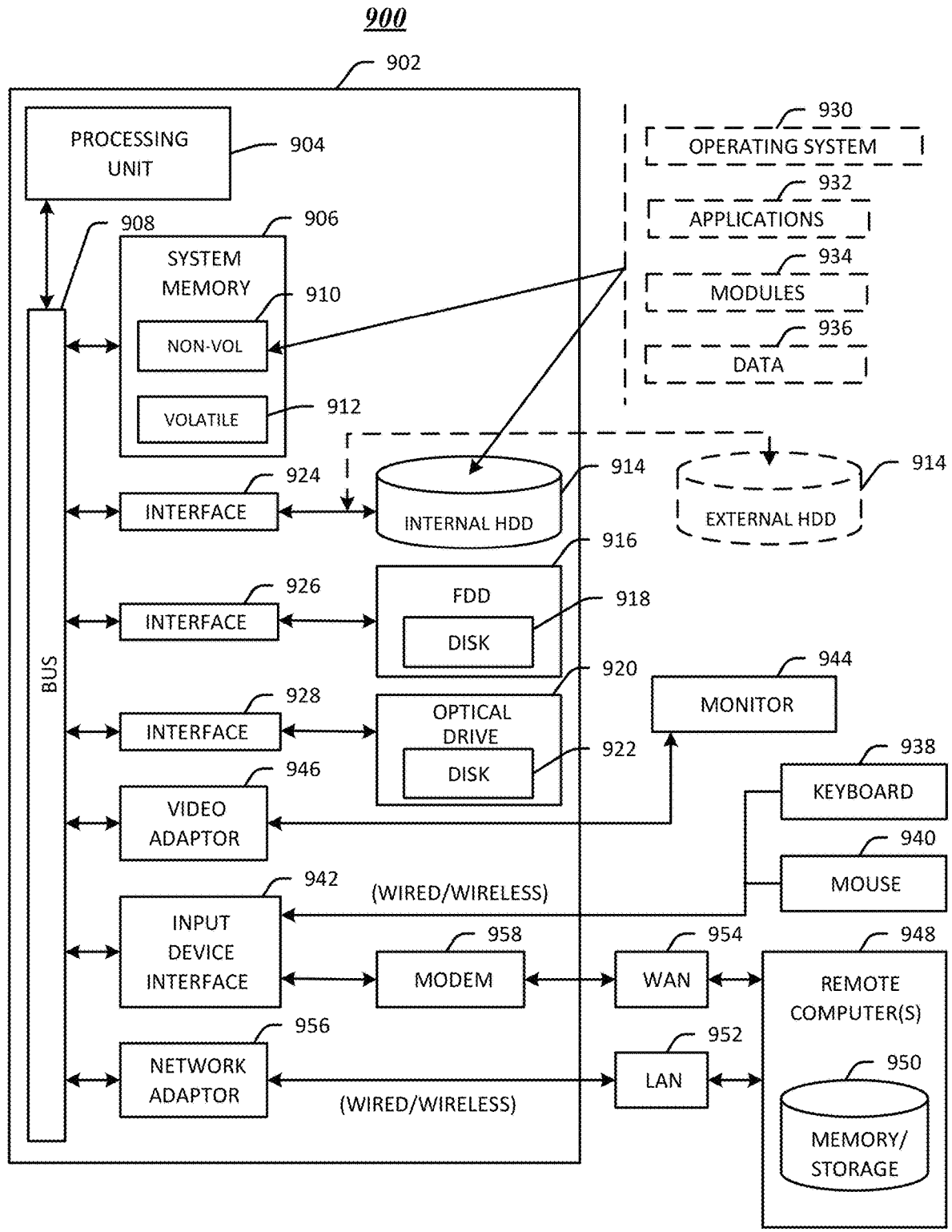
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by an HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908 but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954 or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It may be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
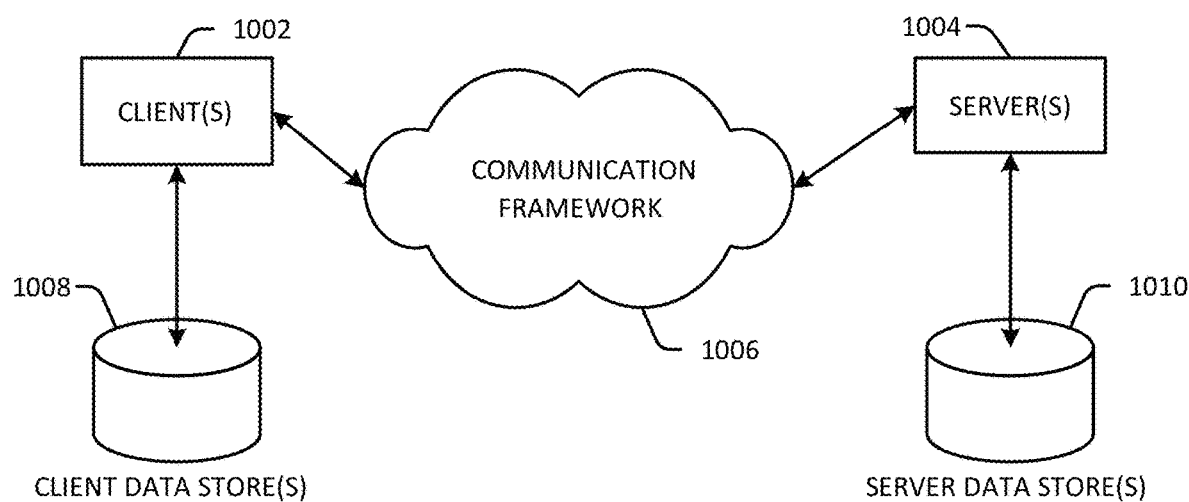
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 1002. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   receiving a key, the key based on a conversion of a first colorspace to a second colorspace, wherein the key is based on a first color channel of a plurality of color channels of the second colorspace;
   receiving an altered key, wherein the altered key is based on an alteration of the conversion from the first colorspace to the second colorspace, wherein the altered key is based on a second color channel of the plurality of color channels of the second colorspace; and
   decrypting, by a processor, encrypted data received via a transmission medium based on the altered key.

2. The method of claim 1, wherein the encrypted data is encrypted based on the alteration of the conversion from the first colorspace to the second colorspace.

3. The method of claim 1, wherein the key is based on a superimposition of a first color channel of a plurality of color channels of the first colorspace onto a first color channel of a plurality of color channels of the second colorspace.

4. The method of claim 1, wherein the key is based on a first ordering of a plurality of color channels of the second colorspace, wherein the altered key is based on a second ordering of the plurality of color channels of the second colorspace, wherein the first ordering is distinct from the second ordering.

5. The method of claim 1, wherein the alteration of the conversion from the first colorspace to the second colorspace comprises converting the first colorspace to a third colorspace, the first, second, and third colorspaces comprising distinct colorspaces.

6. The method of claim 1, wherein the key is further based on a first range of values of the first color channel, wherein the altered key is based on a second range of values of the first color channel, wherein the first and second ranges are distinct ranges.

7. The method of claim 1, wherein the alteration of the conversion from the first colorspace to the second colorspace alters at least one attribute of the conversion from the first colorspace to the second colorspace.

8. The method of claim 1, wherein the first colorspace is an RGB colorspace and wherein the second colorspace is distinct from the RGB colorspace.

9. A non-transitory computer-readable storage medium, the computer-readable storage medium including instructions that when executed by a processor, cause the processor to:
receive a key, the key based on a conversion of a first colorspace to a second colorspace, wherein the key is based on a first color channel of a plurality of color channels of the second colorspace;
receive an altered key, wherein the altered key is based on an alteration of the conversion from the first colorspace to the second colorspace, wherein the altered key is based on a second color channel of the plurality of color channels of the second colorspace; and
decrypt encrypted data received via a transmission medium based on the altered key.

10. The computer-readable storage medium of claim 9, wherein the encrypted data is encrypted based on the alteration of the conversion from the first colorspace to the second colorspace.

11. The computer-readable storage medium of claim 9, wherein the key is based on a superimposition of a first color channel of a plurality of color channels of the first colorspace onto a first color channel of a plurality of color channels of the second colorspace.

12. The computer-readable storage medium of claim 9, wherein the key is based on a first ordering of a plurality of color channels of the second colorspace, wherein the altered key is based on a second ordering of the plurality of color channels of the second colorspace, wherein the first ordering is distinct from the second ordering.

13. The computer-readable storage medium of claim 9, wherein the alteration of the conversion from the first colorspace to the second colorspace comprises converting the first colorspace to a third colorspace, the first, second, and third colorspaces comprising distinct colorspaces.

14. The computer-readable storage medium of claim 9, wherein the key is further based on a first range of values of the first color channel, wherein the altered key is based on a second range of values of the first color channel, wherein the first and second ranges are distinct ranges.

15. The computer-readable storage medium of claim 9, wherein the first colorspace is an RGB colorspace and wherein the second colorspace is distinct from the RGB colorspace.

16. A computing apparatus comprising:
a processor; and
a memory storing instructions that, when executed by the processor, cause the processor to:
receive a key, the key based on a conversion of a first colorspace to a second colorspace, wherein the key is based on a first color channel of a plurality of color channels of the second colorspace;
receive an altered key, wherein the altered key is based on an alteration of the conversion from the first colorspace to the second colorspace, wherein the altered key is based on a second color channel of the plurality of color channels of the second colorspace; and
decrypt encrypted data received via a transmission medium based on the altered key.

17. The computing apparatus of claim 16, wherein the encrypted data is encrypted based on the alteration of the conversion from the first colorspace to the second colorspace.

18. The computing apparatus of claim 16, wherein the key is based on a superimposition of a first color channel of a plurality of color channels of the first colorspace onto a first color channel of a plurality of color channels of the second colorspace.

19. The computing apparatus of claim 16, wherein the key is based on a first ordering of a plurality of color channels of the second colorspace, wherein the altered key is based on a second ordering of the plurality of color channels of the second colorspace, wherein the first ordering is distinct from the second ordering.

20. The computing apparatus of claim 16, wherein the key is further based on a first range of values of the first color channel, wherein the altered key is based on a second range of values of the first color channel, wherein the first and second ranges are distinct ranges.

\* \* \* \* \*